April 22, 1941.     G. R. KING     2,238,887
VALVE-SETTING MICROMETER GAUGE
Filed July 20, 1940     2 Sheets-Sheet 1
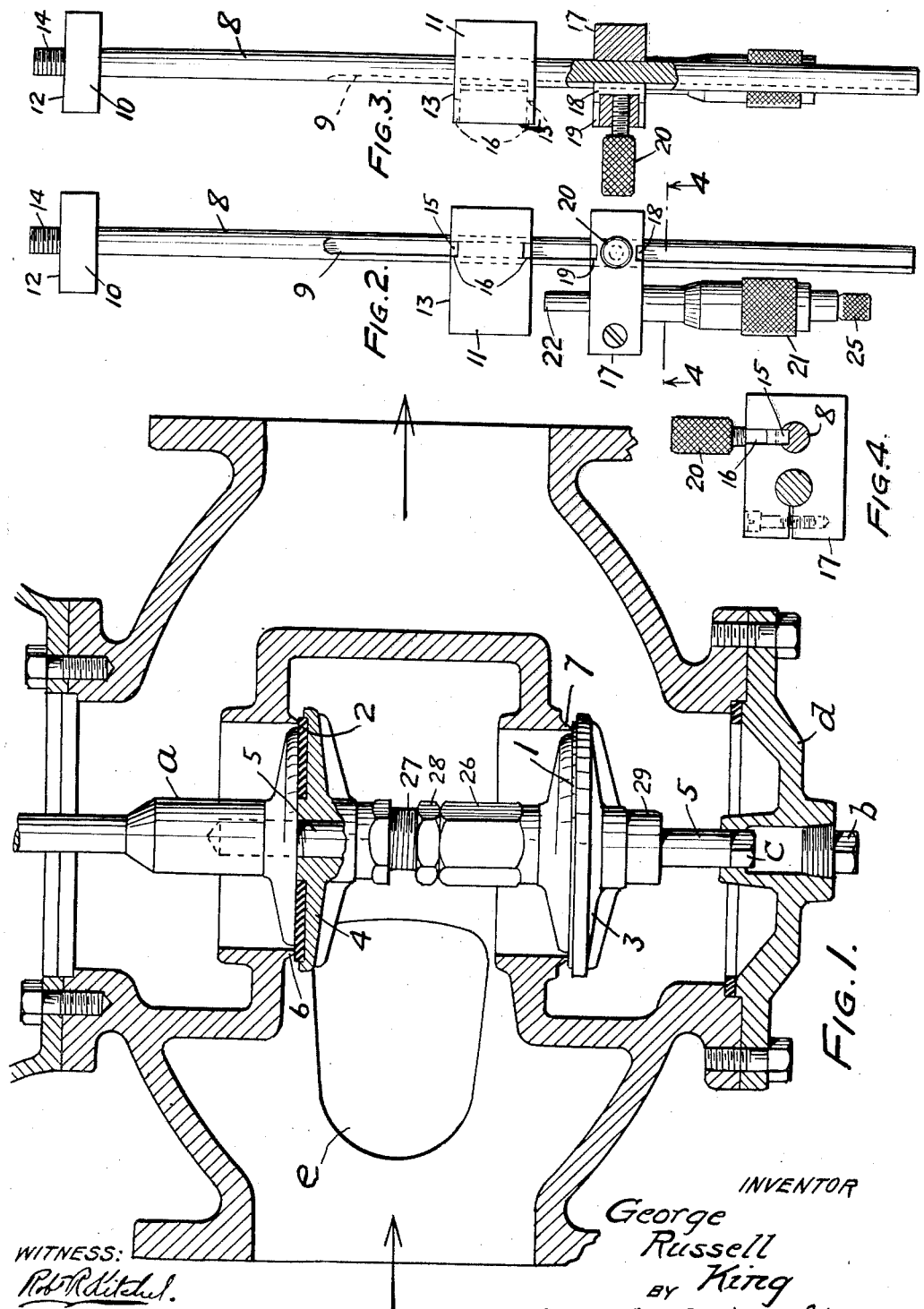
INVENTOR
George Russell King
BY Augustus B. Stoughton
ATTORNEY.
WITNESS:
Robt R Kitchel

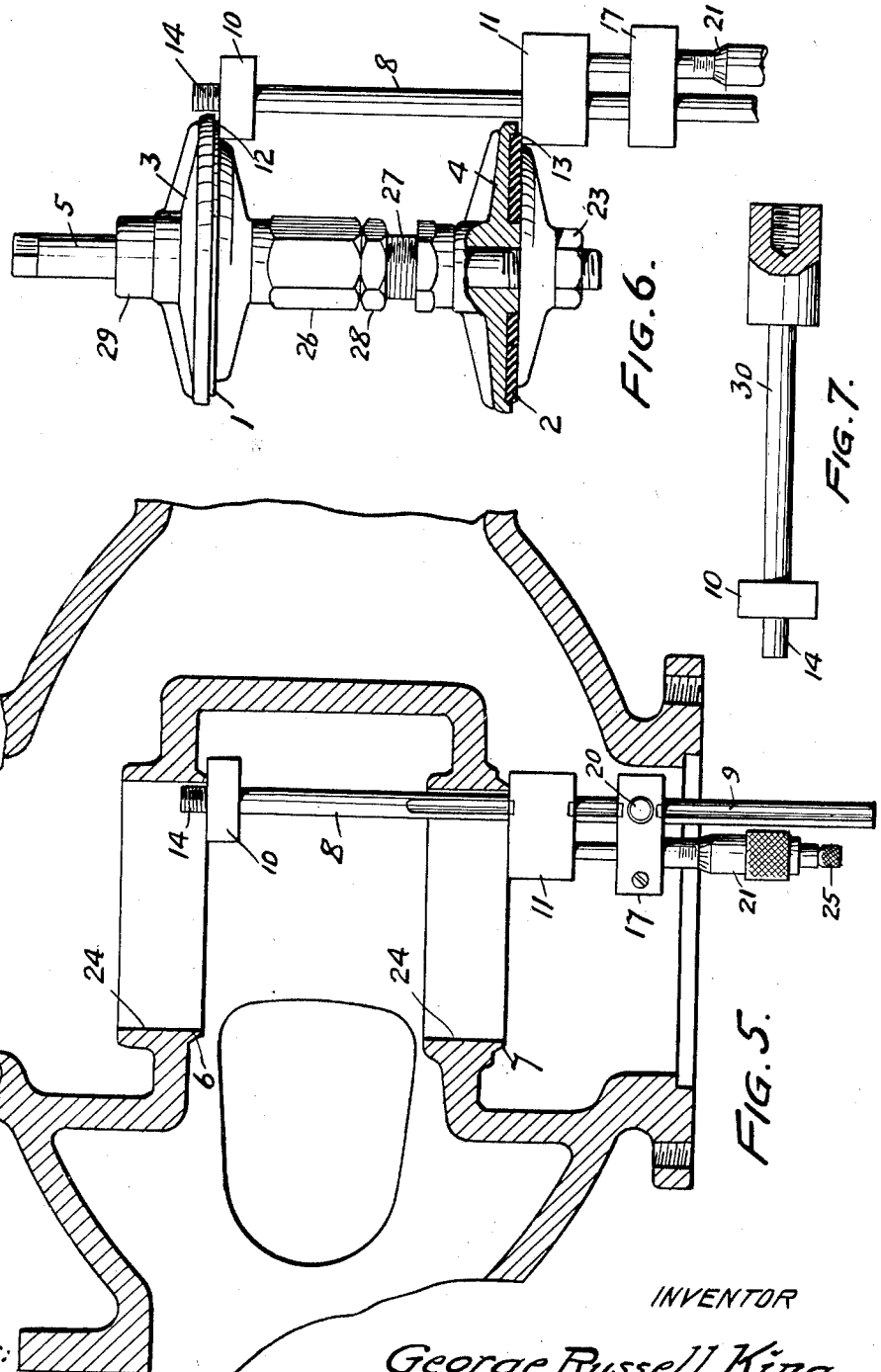

Patented Apr. 22, 1941

2,238,887

UNITED STATES PATENT OFFICE 2,238,887

VALVE-SETTING MICROMETER GAUGE

George Russell King, Upper Darby, Pa.

Application July 20, 1940, Serial No. 346,463

7 Claims. (Cl. 33—180)

A valve-setting gauge embodying features of the invention is intended for use in adjusting the leather or like faced balanced valves of gas district and line regulators and similar appliances to the knife-edges of their seats.

There are in a gas district regulator two similarly disposed knife-edged seats, and there is a spindle carrying two balanced leather-faced disk valves which co-operate respectively with said knife-edged seats. If, in the movement of the spindle, one of the leather or like faces bears upon its seat harder than the other leather or like face bears upon its seat, the first face will be more deeply grooved and sooner worn out than the other. Furthermore, there would be leakage at the leather which bears more lightly on its valve edge, and there are other disadvantages too well understood to require description.

The principal object of the present invention is to provide simple, reliable and easily manipulated means by which the balanced valves can be adjusted exactly to their seats, thus overcoming the defects and disadvantages above referred to.

Another object of the invention is to provide for adjusting the valves on their stem outside of the gas district regulator which is usually located under ground.

Another object is to eliminate the necessity, existing under prior methods of adjustment, of removing the valves and stem from the regulator after the adjustment has been made outside of the regulator and the assembly re-installed in the regulator.

Other objects of the invention will appear from the following description at the end of which the invention will be claimed.

Generally stated, the invention comprises: a gauge including a relatively fixed block having guiding and measuring faces disposed at right angles to each other, a relatively movable block having guiding and measuring faces disposed at right angles to each other, the measuring faces being parallel and similarly disposed and the guiding faces being in alignment and perpendicular to the measuring faces, and a movable micrometer having the measuring end of its stem confronting a non-measuring portion of the movable block.

The invention also comprises the improvements to be presently described and finally claimed.

In the following description, reference will be made to the accompanying drawings forming part hereof and in which:

Figure 1 is a transverse sectional view of a gas district regulator showing such parts thereof as are necessary for an understanding of the invention;

Figure 2 is a side view of a micrometer gauge embodying features of the invention;

Figure 3 is a view taken at right angles to the view of Figure 2 and showing in section features of construction;

Figure 4 is a sectional view taken on the line 4—4 of Figure 2;

Figure 5 is a view similar to Figure 1, with parts removed, illustrating the application of the gauge for accurately measuring the distance apart of the knife-edged valve seats;

Figure 6 is a view illustrating the application of the gauge for measuring the distance apart of the leather faces of the valves when they and their spindle are removed from the regulator; and Figure 7 is a view, partly in section, illustrating the extension which may be applied to the gauge when it is to be used with larger regulators.

Referring to the drawings, 1 and 2 illustrate the leather or like faces of the valve disks 3 and 4 which are adjustable in respect to the spindle 5 in such a way that the valve faces can be moved toward and away from each other. 6 and 7 indicate knife-edged seats which co-operate with the leather faces 1 and 2. It will be understood that the valve spindle 5 is moved in response to pressure on the outlet side of the regulator upward and downward through the intervention of mechanism that is too well understood to require illustration and description. So far as described, nothing new has been indicated and it is obviously necessary that the leather faces seat and bear alike on their knife-edges.

A valve-setting micrometer gauge embodying features of the invention and adapted for use in adjusting the leather-faced valves to their knife-edged seats will now be described. 8 is a stem having a keyway 9. 10 and 11 are a pair of gauge elements shown as blocks of which the block 11 is larger than the block 10. These blocks have similarly disposed parallel measuring faces 12 and 13 each of which is perpendicular to the stem 8. One of these elements 10 is fixedly mounted on the stem near its upper end beyond which the stem projects as at 14. The other element 11 is slidably mounted on the stem within the limits of the keyway 9. For this purpose, the element 11 is provided with a key 15 of which the ends are turned out and arranged in grooves 16, the purpose being to avoid projecting parts. 17 is a micrometer clamp slidably mounted on the stem 8 and disposed between the movable gauge element 11 and the lower end of the stem, and it is provided with a key 18 (Fig. 3) the ends of which lie in slots 19. 20 is a set-screw for positioning the micrometer clamp in respect to the stem. The micrometer clamp 17 carries a micrometer 21 and the measuring end 22 of the micrometer stem confronts the back or lower portion of the movable gauge element 11.

It may be remarked that the faces 12 and 13 together with the adjacent portions of the stem 8 provide not only measuring surfaces or faces but also guide surfaces or faces, the former being parallel to each other and the latter being in alignment and at right angles to the former.

A description of the use of the described gauge for the purpose set forth will now be given. The valve spindle 5 (Fig. 1) is unscrewed from its shank a, for which purpose the plug b is removed and use may be made of the squared end c. The result of this is that both valve disks 3 and 4 fall. The lower valve disk 3 is removed by taking off the cover plate d and the upper valve disk 4 is removed through the hand-hole e the cover of which, of course, has been removed. The valve parts are then re-assembled as shown in Fig. 6 and are held to place by the application of a nut 23 as shown in Fig. 6. This, of course, can be done in any convenient locality. The micrometer gauge is then applied to the valve seats as indicated in Fig. 5 and in that position the measuring faces of the blocks contact or confront the knife-edges, whilst the portions of the stem above the blocks co-operate with the bounding walls of the valve ports 24 to position the gauge vertically. In the drawings the stem 8 is not shown directly in contact with these walls and this is done for the sake of clearness but, in use, these parts may be in contact. By means of the micrometer clamp 17, and before the gauge is applied to the valve seats the block 11 is brought more or less roughly into position; then the roughly-adjusted gauge is applied to the valve seats and an accurate measurement may be taken by manipulating the micrometer itself. For this purpose use may be made of the ratchet-knob 25 of the micrometer. The readings may be well taken at several positions around the knife-edges and an average of these readings obtained.

Referring more particularly to Fig. 6, the distance between the leather faces 1 and 2 is measured by means of the described gauge in substantially the same way that the distance between the knife-edges 6 and 7 were measured, it being understood that no change is made in the position of the micrometer clamp 17 on stem 8 from its position as used to measure the valve seats. The average micrometer measurement between the knife-edges 6 and 7 is compared with the average micrometer measurement between the leathers 1 and 2 and the difference indicates the required adjustment of the leathers. As shown in the drawings, this is effected by means of the nut 26 on the threaded sleeve 27 and, when made, is set by means of the jambnut 28, it being understood that the valve disk 3 is held against movement on the spindle 5 by the collar 29 and that the valve disk 4 is movable on the spindle 5. Many older style regulators do not have the adjusting nuts 26, 27 and 28, but have a solid spacer-piece between the valve disks 3 and 4 in which adjustment is made by metal or paper shims of known thickness. When the leathers 1 and 2 have been properly adjusted a distance apart equal to the distance between the knife-edges 6 and 7, the nut 23 is removed and the parts re-assembled in the regulator as shown in Fig. 1.

In the event that the stem 8 is not long enough for use in connection with a larger regulator, an extension 30 (Fig. 7) may be added at the upper end of the stem of the gauge. The extension 30 is provided with a block similar to the block 10 and, of course, more than one extension or extensions of different lengths may be employed.

It will be obvious to those skilled in the art that modifications may be made in details of construction and in matters of mere form without departing from the spirit of the invention.

I claim:

1. A valve-setting micrometer gauge for use in adjusting the leather or like faced balanced valves of gas district and line regulators and the like to their knife-edged seats which comprises, in combination, a stem, a pair of gauge elements having similarly disposed parallel measuring faces each perpendicular to the stem and of which one element is fixedly mounted on the stem near one of its ends and beyond which the stem projects and of which the other element is slidably mounted on the stem, the portion of the stem between the gauge elements and the projecting end portion of the stem serving in co-operation with the walls of the valve ports and the rims of the valves to position the faces of the gauge element in respect to the knife-edges of the valve seats of the regulator and in respect to the leathers of the faces of the valves of the regulator, a micrometer clamp slidably mounted on the stem and disposed between the movable gauge element and the adjacent end of the stem and provided with means for clamping it on the stem, and a micrometer carried by the clamp and having the measuring end of its stem confronting the back of the movable gauge element.

2. A micrometer valve-setting gauge for use in adjusting valve faces of gas district regulators and the like to the knife-edges of their seats which comprises, in combination, a stem having a keyway, a block having a measuring face and rigidly mounted on the stem and spaced from the end of the keyway and beyond which the end of the stem projects, a second block having a measuring face and mounted on the stem and freely movable within the limits of the keyway, said measuring faces being similarly disposed and parallel and perpendicular to the stem, a micrometer clamp mounted on the stem and slidable in respect to the keyway, means for setting the micrometer clamp on the stem, and a micrometer carried by the clamp and having the measuring end of its stem confronting a non-measuring portion of the movable block.

3. A valve-setting micrometer gauge for use in adjusting a pair of valve faces mounted on a common spindle to their similarly disposed seats which comprises, in combination, a gauge element having two faces disposed at right angles to each other and fixedly mounted, a second gauge element having two faces disposed at right angles to each other and adjustably mounted in respect to the first gauge element, two of the faces being parallel and similarly disposed and the other two faces being in alignment, a micrometer adjustably mounted and having the measuring end of its stem confronting a non-measuring portion of the movable gauge element, and means for holding the gauge elements and micrometer in the described operative relationship with the micrometer slidable and clampable in respect thereto.

4. A valve-setting micrometer gauge for use in adjusting the leather-faced balanced valves of gas district regulators and the like to their knife-edged seats which comprises, in combination, a stem, a block having a measuring face and fixedly mounted at one end of the stem which passes through and extends beyond it affording a guiding plate, a second block having a measuring face and slidably but not turnably mounted on the stem which passes through it and provides a guiding plate, said measuring faces being parallel and similarly disposed, and a micrometer slidably and clampably but not rotatably mounted on the stem and having the measuring end of its stem confronting a non-measuring portion of the movable block.

5. A valve-setting micrometer gauge substantially as described in claim 4 and in which both blocks are rectangular.

6. A valve-setting micrometer gauge substantially as described in claim 4 and in which both blocks are rectangular and in which the slidable block is larger than the fixed block.

7. A micrometer gauge comprising, a pair of gauge elements each having two similarly disposed faces arranged at right angles to each other and of which one gauge element is fixedly mounted and the other gauge element is adjustably mounted in respect to the first, a micrometer adjustably mounted and having the measuring end of its stem operatively arranged in respect to a non-measuring portion of the movable gauge element, and means for holding the gauge elements and micrometer in the described operable relationship with the micrometer slidable and clampable in respect thereto.

GEORGE RUSSELL KING.